(12) United States Patent
Goodwin

(10) Patent No.: US 7,158,978 B2
(45) Date of Patent: Jan. 2, 2007

(54) NETWORK METHOD SYSTEM AND APPARATUS FOR RECORDING AND MAINTAINING RECORDS

(76) Inventor: Thomas R. Goodwin, P.O. Box 3821, Wilmington, NC (US) 28406

( * ) Notice: Subject to any disclaimer, the term of this patent is extended or adjusted under 35 U.S.C. 154(b) by 534 days.

(21) Appl. No.: 09/755,317

(22) Filed: Jan. 5, 2001

(65) Prior Publication Data

US 2002/0091756 A1 Jul. 11, 2002

(51) Int. Cl.
*G06F 11/14* (2006.01)
*G06F 15/16* (2006.01)

(52) U.S. Cl. .................. 707/100; 709/203; 707/104.1; 707/200; 707/204; 707/205; 707/207; 707/213; 707/215; 707/219; 711/100

(58) Field of Classification Search ................ 709/203, 709/100–104.1; 707/204; 701/29, 200–207, 701/213–219
See application file for complete search history.

(56) References Cited

U.S. PATENT DOCUMENTS

| | | | | |
|---|---|---|---|---|
| 4,404,641 A | | 9/1983 | Bazarnik ................... 364/567 |
| 5,168,444 A | * | 12/1992 | Cukor et al. .................. 705/1 |
| 5,778,381 A | | 7/1998 | Sandifer ...................... 707/104 |
| 5,813,009 A | * | 9/1998 | Johnson et al. ............. 707/100 |
| 5,931,878 A | * | 8/1999 | Chapin, Jr. .................. 701/30 |
| 5,973,731 A | * | 10/1999 | Schwab ....................... 348/161 |
| 5,987,474 A | | 11/1999 | Sandifer ...................... 707/104 |
| 5,991,731 A | * | 11/1999 | Colon et al. ................... 705/3 |
| 6,003,808 A | | 12/1999 | Nguyen et al. ............. 244/1 R |
| 6,052,631 A | | 4/2000 | Busch et al. ................. 701/29 |
| 6,278,913 B1 | * | 8/2001 | Jiang ............................. 701/3 |
| 6,292,806 B1 | * | 9/2001 | Sandifer .................. 707/104.1 |
| 6,308,120 B1 | * | 10/2001 | Good .......................... 701/29 |
| 6,347,329 B1 | * | 2/2002 | Evans ........................ 709/202 |
| 6,353,796 B1 | * | 3/2002 | Schipper et al. ............ 701/207 |
| 6,487,479 B1 | * | 11/2002 | Nelson ....................... 709/223 |
| 6,602,469 B1 | * | 8/2003 | Maus et al. ................ 422/68.1 |

* cited by examiner

*Primary Examiner*—Jeffrey Pwu
(74) *Attorney, Agent, or Firm*—Michael E. Mauney

(57) ABSTRACT

A computerized record keeping system and method using a network to keep records that cannot be erased by a user thereby guaranteeing the accuracy of records kept with the system. A client computer system contacts, through a computer network, a server system which stores a client database accessible by a password. The client system can review, search, and add records to the database. The client database on the server system is automatically backed-up to avoid inadvertent loss of records or data. Once a record is entered into the server system through the client system, it is permanently stored in the server system as a part of the client database. While a client system may enter a modified record, the original record is always maintained and displayed with the now modified record.

20 Claims, 15 Drawing Sheets

PlaneLog.Com
Make Maintenance Record

PlaneLog.Com
Modify Previous Entry

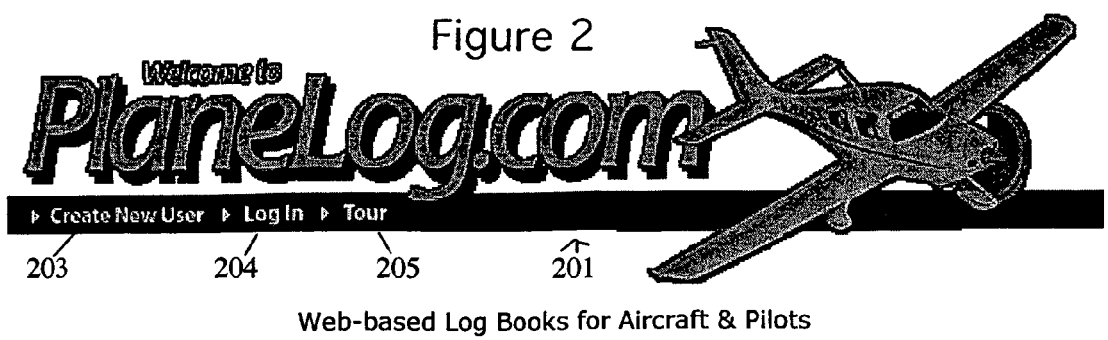

Web-based Log Books for Aircraft & Pilots

Thanks for visiting our site. Please log on for your 30 day free Pilot Log trial

What you need to access the PlaneLog/PilotLog system:

202→
1. A web browser that is capable of understanding html forms and tables. Almost any web browser will suffice.
2. Cookies must be enabled on your web browser.
3. Caching must be disabled on your web browser.
4. Javascript support, while not required, should be enabled on your web browser.

Secure Site supported by

Figure 2a1

PlaneLog.com 
Web-based Log Books for Aircraft & Pilots!

201

PlaneLog.com Web-based Aircraft and Pilot Logs

PlaneLog.com Aircraft Logs - This is a comprehensive system which will allow one to document the history of the aircraft. The PlaneLog.com system transfers the current paper-based versions of FAA required aircraft logbooks into electronic data files through the use of the world-wide web and electronic databases. The system will allow for all of the necessary engine, airframe, avionics and propeller historical data. Reminder notes are programmed into the system to notify the aircraft owner of up-coming inspections and critical notices. The Standard Version Aircraft Log provides a static list of all AD's applicable to that particular aircraft and it's engine(s) while the Professional Version Aircraft Log provides a continuously updated version of all AD's. A handy organizational binder is also provided with the service.

PlaneLog.com Pilot Logs - Pilotlog is the digital equivalent of the standard pilot logbook and so much more. PlaneLog.com's Pilotlog will help you maintain the high level of safety that flying demands. The system contains numerous alerts and notices to let you know if you are current to fly in certain conditions. Can you remember when your medical bi-annual exam is due or if you have logged 3 take offs and landings for both day and night in the past 90 days? PlaneLog.com's Pilot Log system will let you know as soon as you log on!

PlaneLog.com Aircraft and Pilot Logs

Enhance Aircraft Value & Boost Aircraft and Pilot Safety!

* Secure access - password protected

* Legible, searchable, retrievable world-wide

* No software to install

* No lost log books

Security - PlaneLog.com is a Verisign Company. The most trusted software and hardware currently available in the market provides back-up and security. This aspect of the business will be continually monitored and updated as necessary to insure the integrity of the system and the privacy of our members. PlaneLog.com uses Secure Socket Layer (SSL), an Internet industry standard, and state-of-the-art encryption to keep your personal information secure.

210

Fee Based Service - There will be an initial set up fee and a monthly access/storage fee. A premium service where the data will be entered by PlaneLog.com staff will be available for an additional fee. Charges will be begin when you complete your log tracking set-up. Standard Fees are as follows. Please note that Fleet/FBO Versions are available with discounts for multiple aircraft.

PLANELOG.COM PRODUCTS & PRICING

| PRODUCTS | PRICING |
|---|---|
| PLANELOG.COM Pilot Log | $99 for Initial Year, $29 Subsequent Years |
| PLANELOG.COM AIRCRAFT LOG STANDARD VERSION* | |
| Single Engine | $99 (Initial) plus $ 22.95 Monthly |
| Twin Engine | $129 (Initial) plus $ 25.95 Monthly |
| PLANELOG.COM AIRCRAFT LOG PROFESSIONAL VERSION** | |
| Single Engine | $149 (Initial) plus $ 29.95 Monthly |
| Twin Engine | $179 (Initial) plus $ 32.95 Monthly |
| PLANELOG.COM AIRCRAFT LOG FLEET/FBO VERSION | Discounts Apply for Multiple Aircraft Call 87-PLANELOG (877-526-3564) for Pricing |

*STANDARD VERSION INCLUDES STATIC LIST OF AD'S

**PROFESSIONAL VERSION PROVIDES CONTINUOUSLY UPDATED LIST OF AD'S

CONTINUE

Figure 2a2

Figure 2a3
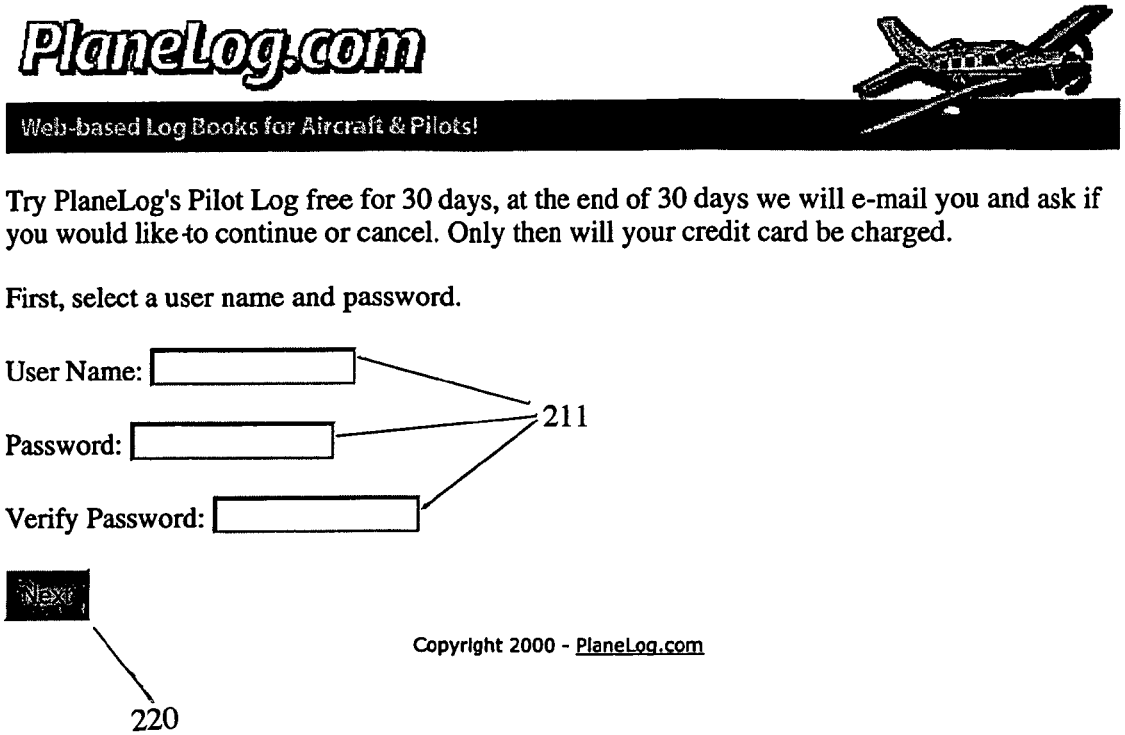

Figure 2b
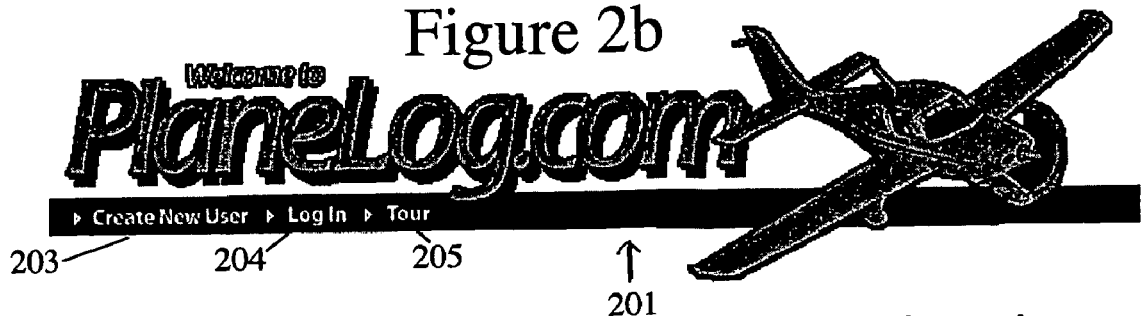
203 — Create New User   204 — Log In   205 — Tour   ↑
                                                    201
Thanks for visiting our site. If you are not already a registered user, please check out our 30 day free Pilot Log trial.
If you are already registered, but have not yet started your Pilot Log logbook, then just log in to Pilot Log below.
LOG IN: User Name: [        ]
          Password:  [        ] — 211
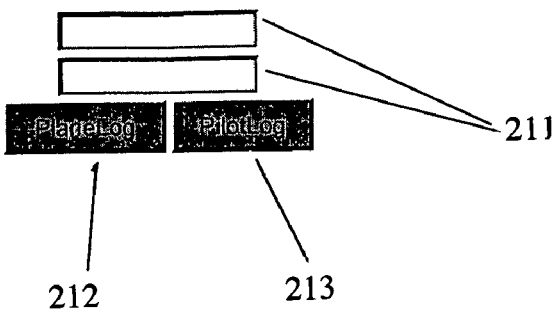
212   213

PlaneLog.com Figure 4

-201

Web-based Log Books for Aircraft & Pilots!

PlaneLog | PilotLog | Contact | Logout

N123PG —— 305

1993 American General AG5B

Unpublished [Publish]

370 — 380 — 390

[Modify Aircraft] [Weight & Balance] [ADs]

Last Entry: December 5, 2000
Last Time (TTAF): 1401.00 ——— 315

Alerts: [Out of Annual] —— 308

[List Entries] [Archive Log] [Make Entry]

310 — 311 — 312 — 313

Quick Search [_____] [Go]

Event Search [- none -] [Go]

314  Copyright 2000 - PlaneLog.com

Attached Engines:

No records found.

Mount an Engine:

No records found.

Attached Appliances:

No records found.

Figure 5

PlaneLog.com
Web-based Log Books for Aircraft & Pilots!

PlaneLog | Contact | Logout |

N123PG -- Log Entry   201
                         305

401

| Authorizing User: | Name: [          ] | Priv: | Unknown |
|---|---|---|---|
| Client 10 | ☐ Unknown | | Repair Cert. |
| other -->> | Cert #: [      ] ☐ Unknown  402 | | A & P |
| | | | I.A. |
| | | | Private |

Repair Station: [              ] —403
Work Order: [              ] —404

☐ Current Date IS NOT Actual Log Entry Date (use date shown below):

Entry:

Month:
[January]
Day: [01]  ←420
Year: [1930]

[                                    ] —405

Tach: [      ] No Tach Entry: ☐ —407

◉ Use current Tachometer Adjustment to compute Total Time
○ Override Current Tachometer Adjustment (use TTAF shown below -- use for historical entries, specifically those made prior to installation of the current tachometer):
○ Replace Current Tachometer Adjustment (use TTAF shown below to compute new tachometer adjustment -- used for physical tachometer replacement):

TTAF: [      ]   When should I enter a total time?

Events

| General Events: | Major Events (form 337): | IFR Events: |
|---|---|---|
| - none - | - none - | - none - |
| Flight Test | STC Modification | Pitot-Static Check |
| Annual Inspection | Major Alteration (non-stc) | VOR Receiver Check |
| Minor Repair | Major Repair | |
| New Parts | | |
| Xpndr / Mode C Test | | |
| Weight & Balance | | |
| ELT Service | | |

[Post Log Entry]
       406

PlaneLog.com — 201

*Web-based Log Books for Aircraft & Pilots!*

PlaneLog | Contact | Logout |

305
N123PG -- Log Entry Details

| Aircraft: | N123PG |
|---|---|
| Serial: | 001450 |
| Date: | December 5, 2000 |
| Tach: | 1401.00 |
| Total Time: | 1401.00 |

| Entry Auth: | A. Body |
|---|---|
| Auth Cert #: | 123456789 |
| Auth Cert: | A & P |

Administrative Data

| Date Entered: | December 5, 2000 | — 705 |
|---|---|---|
| Entering User: | Client10 -- Client 10 | |

This entry has been modified 3 times

The last modification was done for this reason:
*Add Part Number*

—709

Entry: — 506A

```
Removed nosefork, serviced & install new washers.PN 1234.  Adjust fork
tension. Installnew o ring in primer, remove fuel selector, install new o-
rings & lube reinstall. Ops check above ok A. Body A&P 123456789
```

Figure 7

PlaneLog.com — 201

*Web-based Log Books for Aircraft & Pilots!*

PlaneLog | Contact | Logout |

— 305

N123PG -- Log Entry Details

| | | |
|---|---|---|
| Aircraft: | N123PG | Administrative Data |
| Serial: | 001450 | |
| Date: | December 5, 2000 | Date Entered: December 5, 2000 — 706 |
| Tach: | 1400.00 | Entering User: *Client10* -- Client 10 |
| Total Time: | 1400.00 | |

This is an original entry

Entry Auth: A. Body
Auth Cert #: 123456789
Auth Cert: IA

[Modify Entry] — 709

Entry: 506A

```
12/5/00 Tach 1400
Performed Annual inspection IAW Piper service manual and 100 hrs inspection
list. AD check thou 12/5. C/W 90-02-23 Hartzel Prop hub by inspection SB
164C. Next due @ 1450 or 50 flights which ever first. I certify that this
aircraft has been inspected in accordance with an annual inspection and was
determined to be in airworthy condition.
A. Body 123456789 IA
```

NETWORK METHOD SYSTEM AND APPARATUS FOR RECORDING AND MAINTAINING RECORDS

FIELD OF THE INVENTION

The technical field relates to a computer method and system for maintaining records using a network system whereby records are electronically maintained at more than one location.

BACKGROUND OF THE INVENTION

In many different areas, it is desirable to maintain careful records of an activity. For example, an inventor may keep an inventor's notebook which documents when and how an inventor conceived of an idea and how he reduced that idea to practice. This type of record is often kept in a bound notebook where witness' statements may be placed including notarized documents and the like. All of this greatly increases the credibility these records would have in the event an inventor was required to prove his date of invention and his activities toward perfecting his invention in some administrative or court proceeding that may be questioning his right to a patent for his invention. Additionally, it is desirable to keep maintenance records for many types of equipment. For example, one will often see a used car advertised with the notation that the owner has "all the maintenance records". In a similar fashion, maintenance logs are kept for boats, industrial equipment like earth-moving equipment and other expensive machinery. An owner who can clearly document appropriate preventative maintenance can sell used equipment of this type at a premium over a seller who does have these kinds of records.

A specialized area of this type of record keeping is found in the general aircraft industry. Maintenance log books are required by the Federal Aviation Administration for an aircraft engine or engines, the air frame, the prop or props, and the avionics. These records are often kept in a bound log book or in a format with consecutively numbered pages. When maintenance is performed by an aircraft and power plant mechanic, ordinarily licensed by the FAA, this mechanic is required to make a log book entry of what maintenance was performed and sign every entry with his name and license number. This constitutes a permanent record of the maintenance performed on the plane, which is necessary for the plane to be deemed air-worthy, hence, legal to fly. When the FAA determines there is a safety issue for a particular aircraft or specific engine type, they will issue an air-worthiness directive. The aircraft owners are then required to have a certified mechanic check the aircraft for compliance with this air-worthiness directive and then record in the log book that the air-worthiness directive has been completed. In order for the aircraft to be continually deemed air-worthy, there must be written records that show compliance with all air-worthiness directives. If there is no written record, then the air-worthiness directive work must be done again in order for the plane to be deemed air-worthy. Over the life of a complex aircraft it is not uncommon to have multiple air-worthiness directories, sometimes numbering as high as 50, for which compliance must be shown. By the same token, an aircraft pilot must maintain a log book of the amount of times and the circumstances where he or she is acquiring flying experience. One must have a certain amount of current flying time in order to be appropriately licensed to operate a plane.

In a like fashion, hospitals are required to keep charts recording the medical records for a patient during a hospital stay. These hospital charts have to be kept in compliance with standards imposed on the hospital by accrediting agents like the Joint Commission on Accreditation of Hospitals. A hospital that does not keep and maintain medical records or charts on patients to the appropriate standards can lose their accreditation.

When a bound record keeping book is used, then records are entered by hand into the record book. This creates many problems. First, handwritten entries are difficult to read. Second, log books can be lost. For aircraft applications, if the maintenance log book is lost, it can reduce the re-sale price of an aircraft by as much as 15%. Moreover, lost log books may require expensive reduplication of work to comply with aircraft directives which have already been performed in the past but for which no documentation exists if a log book is lost. Third, paper log books, even if carefully kept in bound notebooks, can be altered. In a malpractice claim against a hospital, an altered medical chart can be disastrous because it implies guilty knowledge on the part of the hospital. By the same token, there could be residual doubt in a purchaser of a used airplane or other piece of expensive equipment that the log books accurately reflect what has been done on the plane or other equipment. There is a fear there could be forged entries or altered entries.

Consequently, there is a need for properly maintained, legible, and unalterable records. There is a specific need in the field of aircraft maintenance logs and pilot logs. Such unalterable records can be useful for maintaining records on boats, expensive automobiles, for medical records, or anywhere there is a premium on accurately kept and maintained records with independent verification of the records.

It has been widely recognized that electronic monitoring of maintenance needs can be helpful. For example, Bazarnik, U.S. Pat. No. 4,404,641, discloses a maintenance monitor that alerts one that equipment is due for a particular type of maintenance. Chapin, Jr., U.S. Pat. No. 5,931,878, discloses a computerized prompting system that informs a user that a scheduled maintenance is due to be performed at a selective date. It is contemplated that there could be a connection to a network, specifically the Internet, between a service system and the database whereby a server could send updates from manufacturers to a service system or client system. Nguyen et al., U.S. Pat. No. 6,003,808, provides a maintenance and warranty control system for an aircraft. Here, an onboard engine performance monitoring computer uses a fault code as part of an HTML address. Maintenance actions are automatically recorded for validating or generating warranty claim applications.

In the aircraft maintenance field, some aircraft manufacturers or technical publishers provide computerized engine and air maintenance systems that provide for electronic record keeping and information management. Examples of this type of system are seen in the Sandifer, U.S. Pat. Nos. 5,778,381 and 5,987,474. Disclosed in these patents is a computer based apparatus and method to provide access to complex technical information employed to maintain and repair complicated equipment such as aircraft. This system provides a central source for aircraft technical information which is periodically updated. The Sandifer inventions provide a maintenance and repair information system based on a database of aircraft technical information used on a CD-ROM based computer system. This allows such browsing and search capabilities as are common on CD-ROM based information systems. These inventions also allow a log book to be kept as part of use of the system. This system anticipates that an aircraft owner may wish to gain access to the information on his home computer remotely through a telephone connection.

Despite this earlier work there is still a need to facilitate keeping of accurate, legible, and unalterable maintenance records for aircraft or other types of records that require that records be scrupulously and accurately kept in a form that reduces the possibility of alteration or spoilation. To this end, it is recognized that a recent technological development commonly called the "Internet" can be used to facilitate accurate and unalterable records.

Roughly speaking, the Internet is a large number of computers and computer networks that are interconnected all to each other through various types of communication links. These interconnected computers can be used by a user to exchange information with someone at a far removed computer using various programs to facilitate the exchange of the information. These programs include such things as electronic mail (e-mail), gopher, and the World Wide Web (WWW). The World Wide Web service allows a computer system, usually called a web server or web site, to send web pages of information to a remote client receiving computer system. These web pages usually contain graphical as well as text based information and may have links to other web pages or other web sites. Every site on the World Wide Web is uniquely identifiable by a uniform resource locator (URL). Thus, if a user with a client computer wishes to view a particular worldwide web page, then that user will type in or otherwise input the URL for the desired web page m a request. This type of request is usually called a HyperText Transfer Protocol (HTTP). The client computer is ordinarily linked to the Internet through an Internet service provider, which maintains resources and programs to take the client computer request (HTTP request) which is then forwarded to the web server that supports the web page specified by the URL. When the web server receives the request, it sends information to the client computer system that allows the client computer system to reconstruct the web page and display it using a particular program usually called a browser. A browser is a special purpose or special type of application program that facilitates requesting web pages and displaying of web pages on the computer that is running that browser program.

Currently, web pages are constructed using HyperText mark-up language (HTML). HTML provides a standard set of conventions, sometimes called "tags", that define how a web page is to be displayed. Thus, when a user requests a server to display a web page, the browser sends that request to the server computer system to transfer the appropriate HTML programming document that defines the web page. When that HTML programming document is received by the client computer system, the browser then displays the web page as defined by the HTML programming document. The HTML programming document contains the various protocols or tags that control the display of the text graphics and other features on that web page. Among other things that may be displayed on the web page are the uniform resource locators of other web pages which allows a user to immediately link from that web page through the Internet to the remote web page identified by that URL.

The World Wide Web is especially useful for conducting various types of electronic information exchanges, including many types of commercial displays. Web servers and web pages can advertise and sell products, deliver information about products, store and retrieve information, among many other uses. The particular programming for HTML documents is well established and understood to one of skill in the art in constructing and administering web sites and web pages. For this reason, the exchange and storage of information, be it a computer generated order for an item, computer generated dialog, or computer storage of documents, are easily accomplished through the World Wide Web using browser and HTML documents.

The Internet operates ordinarily by breaking a communication into discreet packets of information and then sending these packets out on the Internet to the destination identified by the URL. These packets may travel through different channels to reach their ultimate destination. In doing so, they may pass through a number of computers along the way. Therefore, sensitive information can be intercepted and viewed at the computers that serve as "way stations" as the packets of information find their way to their ultimate destination identified by the URL. Consequently, information transmitted over the Internet is frequently encrypted or coded. If encrypted or coded information is intercepted, then unless the code can be broken or the encryption scheme deciphered, the information contained in the communication is unreadable hence, useless to the person who intercepted it. Moreover, some web sites may themselves contain sensitive information or valuable information which the owners of those web sites may not wish to make generally available. Consequently, access to these web sites are limited to those with appropriate passwords or other "keys" that will allow one to enter the web site and make use of the information displayed there.

SUMMARY OF THE INVENTION

This invention contemplates that there will be at least one electronic storage area for records accessible through an electronic media. Ordinarily, this would be an Internet based system but it could be an Intranet or some other type of network connection. The remote storage facility can be accessed by a client-user to make new records. However, the client-user will not have the capacity to alter records that have been previously recorded in the remote server/storage system. Hence, the records maintained in the remote server will be unalterable and unerasable by the client-user.

The client-user will have appropriate software in its own client-user input device. The client-user input device in current technology will be a desktop computer connected to the network through cables, be it phone cables, fiber optic cables, coaxial cables, or such similar data transmission cables. However, it is anticipated that in the near future many people will be connected to the Internet by wireless means with a hand-held small computer-like device combining features of current cellular phones and digital assistant-type devices, such as the Palm Pilot. The client-user uses the input device to gain access to the remote storage facility. Once access is gained to the remote storage facility, a variety of methods exist for putting records into the remote storage facility. One way of gaining access would be the use of a specialized software that is part of the client system or a generalized software designed for keeping records within the client computer that constitutes the input device. Under these circumstances records will be first made within the client input device or client-user computer. Once the entries are complete and there have been necessary corrections made and the client-user is ready to record the information, it will be transmitted electronically over the Internet to the remote server where it will be permanently recorded and stored. At this point, the user will have no opportunity to erase or alter those remotely stored records. The user may make follow-up notes to indicate how or why a particular record was incorrect at the time it was made, but will not be able to overwrite or otherwise erase records in the remote server database. Alternatively, the client-user may use a web browser or similar software to directly access a remote server that will serve as the remote storage facility. The remote server will send a web page for display on the client-user's computer. The client-user can make entries into the web page for transmission over the Internet connection to the remote server. Once the record making is complete and the client has signed off from the remote server's web page, the records will be permanently recorded and stored. At that point, the user would have no further opportunity to change those records, although the user could make follow-up notes or corrections to a previously stored record. The corrections would not be in the form of a "over write" but would be additional notes appended to the previously stored and otherwise unaltered records.

As part of the service provided to the client-user, the remote server will maintain and keep records not only entered by the client but also other information of use to the client, such as maintenance requirements, or generalized useful information depending on the particular application. For example, if it is an aircraft maintenance log that is being maintained, then all air-worthiness directives or other service bulletins directed toward that particular type of aircraft could be accessed at the remote server by the client system through the electronic connection over the Internet. The service could keep track of regulations that the client user is required to comply with. If the service notices that records are not kept in compliance with regulations or if, for example, an air worthiness directive has not been complied with, the client can be notified of this failure of compliance and warned to make sure his aircraft is in compliance with the applicable air worthiness directive. The service can also schedule and keep track of required maintenance. This will allow a client to schedule maintenance with a maintenance provider sufficiently in advance of the time maintenance is required to minimize disruptions caused by the maintenance. That is, parts could be ordered and be on hand when required for a particular maintenance procedure. The remote server can maintain schedules and send reminder notices to the client system as may be required. The data and records in the remote server can be printed out by a client system. The remote system will have appropriate graphics and the software implementing the system will be designed in such a way as to make it user friendly and require no particular skills of users like mechanics making entries other than checking, typing, or filling in the appropriate blanks.

The usual functions of data management software to sort, search, and display will be utilized to facilitate ease of use for the client-user. If the public Internet is used, then appropriate privacy and encryption software will be used to insure that data transmission will not be compromised or intercepted. The database maintained for the client at the remote storage facility will be continually updated and backed up and access to the database for a client will be password protected.

The advancing data transmission and data storage capabilities of the Internet and of computers has provided a means for meeting a long-felt, but previously unmet, need for records that are not only readily accessible and easily used, but also whose accuracy is guaranteed by a third party so that it will be impossible for a user, however motivated, to corrupt or alter the records once they have been entered into the remote database. This guaranteed integrity of the record keeping process will add to resale value of complex equipment, could reduce insurance rates in industries or for individuals, and provide an important guarantor of the integrity of records that are being kept wherever that guarantee is needed, be it for an inventor, a hospital, a plane owner, or a pilot.

BRIEF DESCRIPTION OF THE DRAWINGS

FIG. 2 is an example of a web page that would be used as an entry point for the record keeping function of the current invention.

FIGS. 2a1, 2a2, and 2a3 illustrate how a new user would be registered to use the current invention.

FIG. 2b is a page that allows an user to log into the current invention.

FIG. 3 is an introductory page for an user of the current invention to begin accessing the functions provided by the current invention.

FIG. 4 displays the major functions of the client database.

FIG. 5 displays the log entry page.

FIG. 7 displays in detail a specific entry in the database that has been modified.

FIG. 7A displays in detail an original unmodified entry in the client database.

FIG. 8 displays in detail the history of an entry including modifications and the original entry.

DETAILED DESCRIPTION OF THE DRAWINGS

Figure 1:
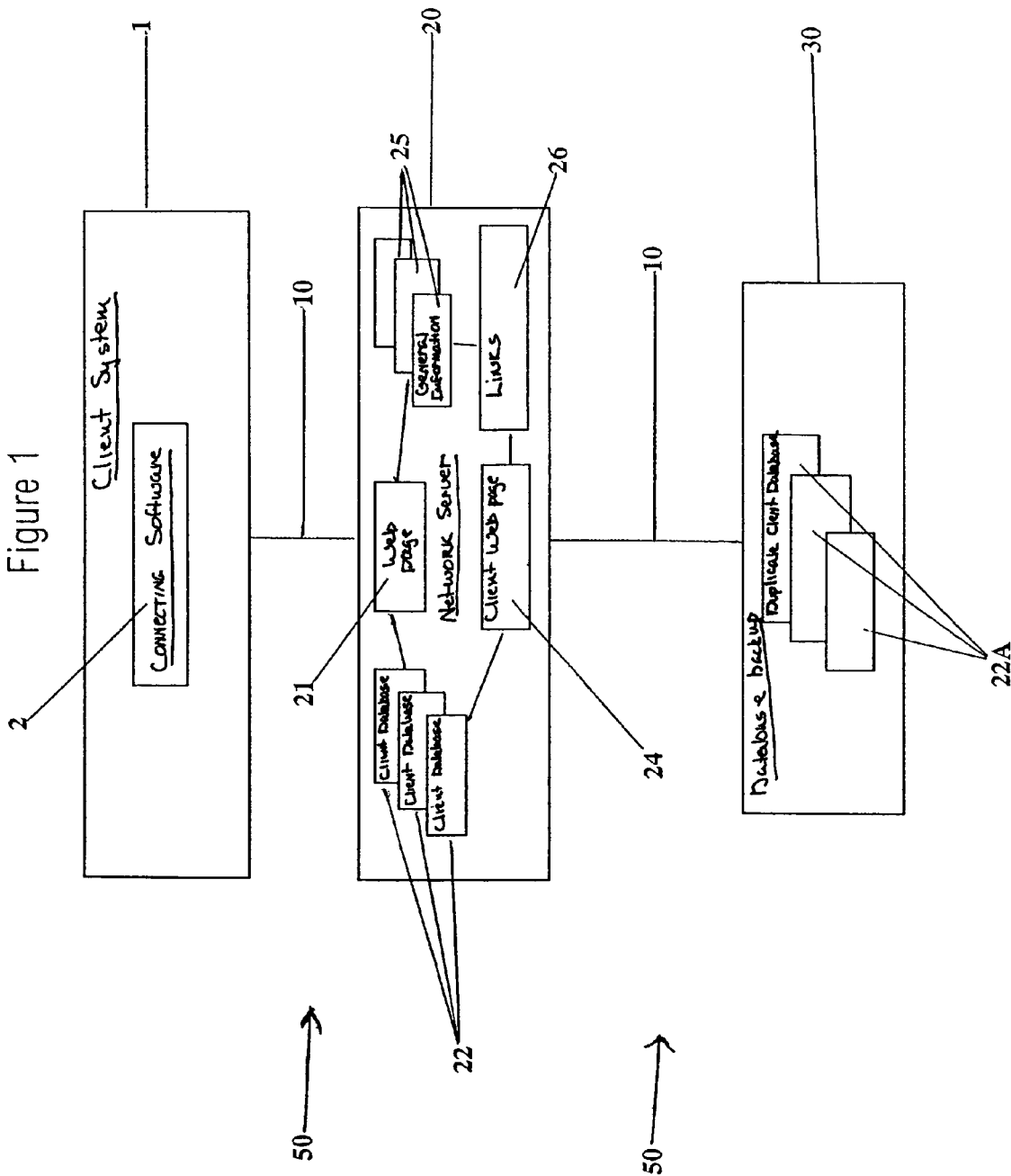
FIG. 1 is a block diagram illustrating an embodiment of the present invention.

In FIG. 1, network record system (50) has three separate locations connected by appropriate network connections (10). First, there is a client system (1). With current technology, the client system (1) will be a computer capable of network connection (10) usually by telephone lines, cable lines, wireless phone transmission, or other means of transmission of data from a client system to a network server (20). In the future, the client system (1) may be a personal digital assistant with a wireless transmitter and receiver or even a cell phone-like device. The client system (1) will have connecting software (2) which may be database software which will have the elements that allow a client to build a database of records in an appropriate form and store them in the client system (1). If the record keeping is for a maintenance record book, then it would consist of individual records devoted to each maintenance action performed which would include what was done, how it was done, the date the work was done, the date of completion, and other relevant information. This information could be stored in a place and form controlled by the client system (1) by a convenient electronic means, for example, using the hard drive of the client system (1) or using removable storage devices like zip drives, compact disks, digital tapes, or the like. In current technology, the client system (1) will need as part of the connecting software (2) an Internet browser-like program for connection to the network server (20). If the Internet browser software is part of the connecting software (2), then the client can use any computer on which the client software is installed as a client system (1) to connect with the network server (20) through a network connection (10) such as a phone line, a DSL line, or so on. It is anticipated that the client would be able to carry a zip drive, a floppy disk, or the like with them in which a complete copy of connecting software (2) is kept. Therefore, if it was necessary to make new records in the record database from a location other than the home location of the client system (1), the client could simply install the connecting software (2) stored on the floppy disk, zip drive, or other storage medium onto another computer turning this computer into the client system (1), make the appropriate entries of records, use a network connection (10) to connect to the network server (20) for appropriate action.

Alternatively, as in the preferred embodiment the connecting software (2) may simply be software which may be used to connect with and interact with the network server (20). In current technology, that connecting software would be an Internet browser program like Netscape® or Internet Explorer®, the two dominant brands of Internet browsers as this application is written. In this embodiment, the uniform resource locator (URL) for the network server (20) would be entered into the Internet browser program, which would then make appropriate connection over the network connection (10) to the network server (20). The network server (20) would then transmit to the client system (1) web pages to be displayed on the client system (1). As will be explained in subsequent paragraphs, the client using the connecting software (2) will enter a password or other identifying information to give the client access to the client database (22) which is stored on the network server (20). Using the linking function of the world wide web software, the client can move from one part of the client database to another part of the client database (22) maintained on the network server (20) to make appropriate entries for new records, to review old records, to find particular kinds of information, and to do all the other types of functions available through database programming. In this embodiment, any computer like device which has means for inputting of data and information and which is connected to the Internet with browser software could be used by a client as a client system (1). All that is required for the client system connecting software (2) is an Internet browser program and the client identifying information or a password.

It is anticipated the network server (20) would use world wide web software to display the client database (22) in a web page format. A variety of web pages will be nested within the site. The introductory web page (21) will be available to anyone generally just as many businesses have web pages that provide information about their business. There may be access on the network server (20) to generalized information (25) such as weather information, stock market information, sports information, news information, as well as links (26) from the network server (20) to other sites. However, the introductory web page (21) will give access to a specific client database (22) which will be accessible only to a particular client subscriber to this system. The client database (22) will require a password to enable the client system (1) to have access to client database (22) that is otherwise inaccessible to a casual visitor to the introductory web page (21). For example, a client who has subscribed to a maintenance record service would have access to client specific web page information (24) of relevance to that subscription. For example, if the client is using the system for an aircraft maintenance log book, then the specific web page information (24) might consist of air-worthiness directives, maintenance information required for a particular type of plane, maintenance reminders that are keyed to previously recorded maintenance work that had been done on the plane and so on.

Once a client has obtained access to the client database (22) the client will then use the software in the network server (20) to do various functions relevant to the specific types of record being maintained in the client database (22). For example, if the client database (22) consists of maintenance records, database software will ordinarily have such functions as the ability to search for a particular type of record which may be done on the basis of the appearance of a particular word. It could also look for records that were completed on a particular day or time, completed by a particular person, and so on. This will enable the client to readily review previously entered maintenance records. As necessary, the client will enter new records using the client system (1), the connecting software (2), the network connection (10), and the network server (20). New records could record recently completed maintenance work. In this way, a client would have a complete up-to-date set of maintenance records maintained in the client database (22) on the network server (20). Ordinarily, the maintenance records will be first typed or keyed into the client system (1) transmitted by the connecting software (2) using the network connection (10) to the network server (20). The client would carefully review the records to be sure they are accurate before entering them permanently in the client database (22). Once the records are permanently entered in the client database (22), they are thereafter undeleteable by the client.

Once records have been entered into the client database (22), they will be permanently stored in the database back-up (30) as a duplicate client database (22A). Any permanent record entered into the client database (22) will be permanently stored in the duplicate database (22A). In the event something happens to the network server (20) to alter or destroy the client database (22), it can be readily restored using the database back-up (30) and the duplicate database (22A).

In this way, many clients may have four sets of maintenance records. First, will be the actual paper maintenance records which are not part of the network record system (50). Secondly, in one embodiment of the network record system (50), there may be a set of records maintained as part of the connecting software (2). Third, there will be the client database (22) maintained on the network server (20) and available to the client through the client system (1) and the connecting software (2). Fourth, will be the duplicate database (22A) maintained in the database back-up (30) in a location different from the network server (20). In this fashion, the network record system (50) maintains permanent, backed-up records for a client, which are undeleteable by the client, and serve as a guarantor of the accuracy and completeness of records.

Figure 1A:
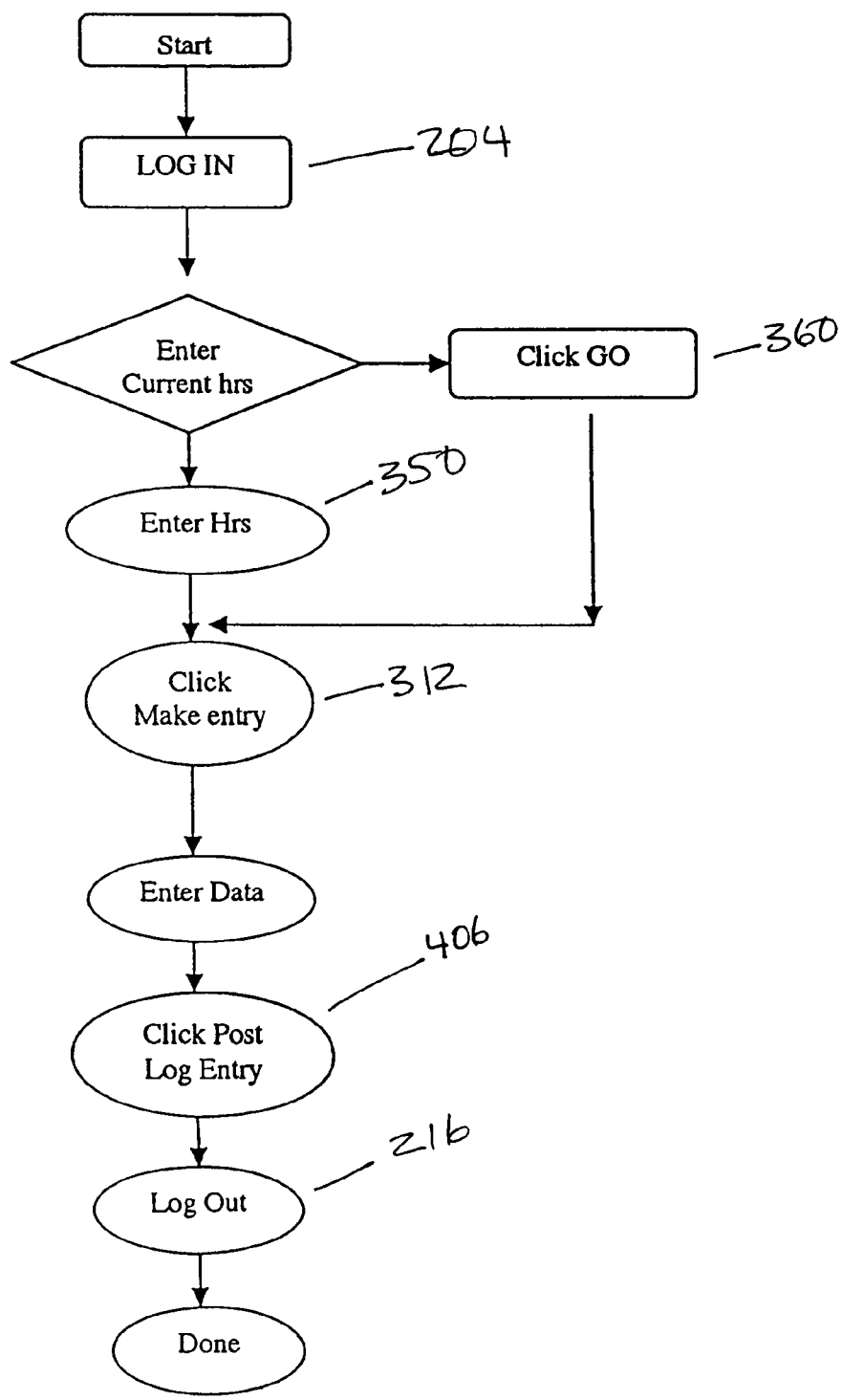
FIGS. 1A and 1B are flow charts illustrating how the embodiment of FIG. 1 works.
Figure 1B:
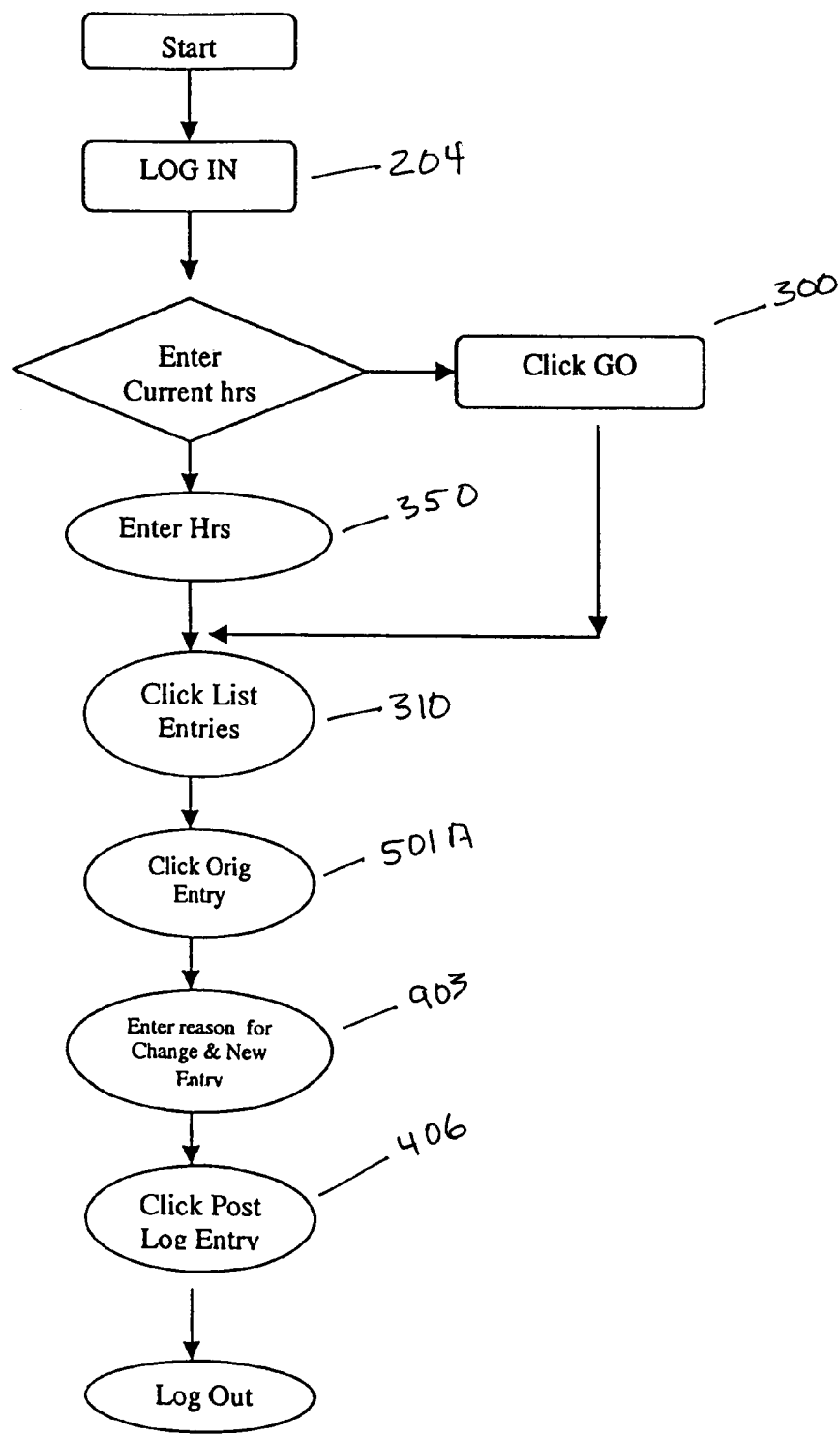
Figure 3:
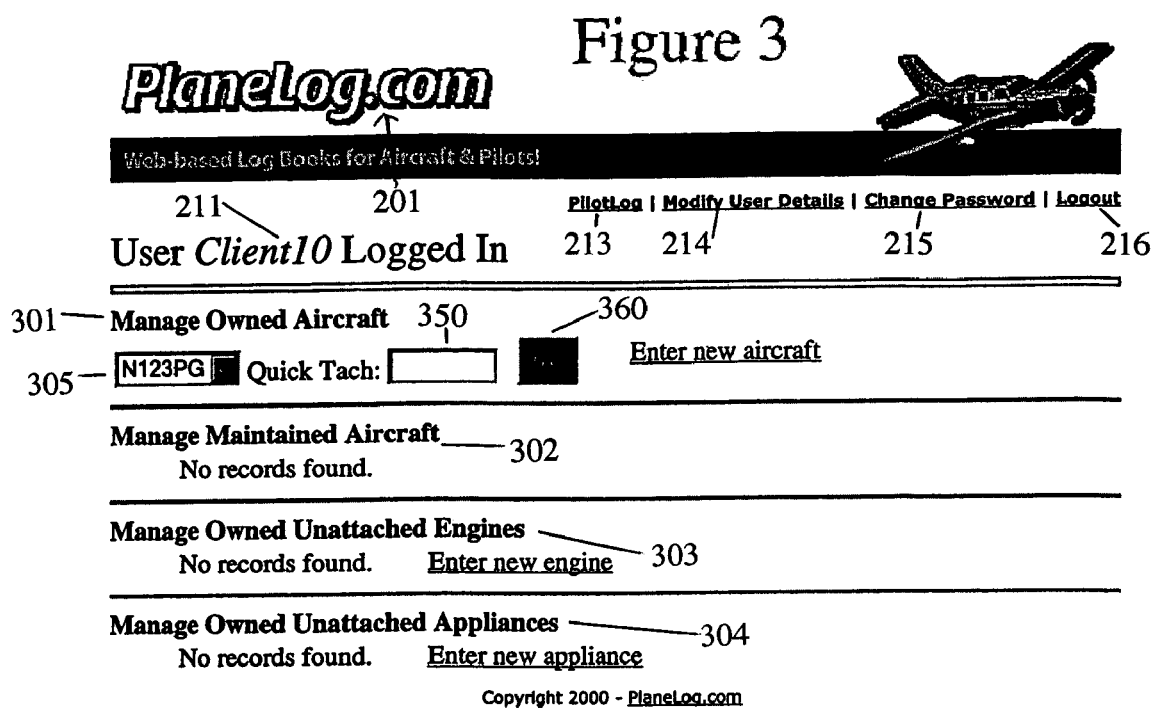
Figure 6:
FIG. 6 displays log entries.

The remaining figures in the Detailed Description of the Drawings are directed toward a specific embodiment of the network record system (50) invention. For this particular embodiment, the figures shown are for a record keeping system for a plane maintenance log record. On the client system (1) a URL is entered for the server system (20). In using standard Internet technology, the client system (1) sends a request through the network connection (10) to the server system (20) to send the web page represented by the URL entered into the Internet browser on the client system (1). The server system (20) will transmit the information, usually in hypertext mark-up language, to the client system (1) so that the client system (1) will visually display the web page that represents the beginnings of the network record system (50). FIGS. 1A and 1B are flow charts showing how a record might be entered in a record keeping system for plane maintenance log records. In FIG. 1A, one uses the client system (1) and the network connection (10) to connect to the network server (20) illustrated by the start box in FIG. 1A. Once one is connected to the network server (20), one will log in usually by entering a password or some other identifying information which will connect one to the client database (22). The first option to enter a record would be to enter the current hours on the aircraft. However, this is not mandatory and one may bypass entering the hours by clicking "go" as is shown in the flow chart. FIGS. 2, 2a1, 2a2, 2a3 and 2b are specific illustrations of an embodiment of this invention where one logs in to the system and progresses to the point where one is prepared to make an entry into the client database (22). To make an entry, one proceeds through client database as shown in FIGS. 3, 4, and 5. Once one posts the log entry, as is shown in the flow chart in FIG. 1A, one is ready to log out of the system with the record archived. An archived record is shown in FIG. 6. FIG. 1B shows how to modify a previously made entry. Again, one proceeds through the log in procedure to a page as shown in FIG. 4, but instead of clicking on make entry button (312), one clicks on the list entry button (310). To change a listed record as is shown in FIG. 6, one clicks on orig. button (501A). One may then enter reasons for change in the new entry (see FIG. 8), clicking on the post button (406) and logging out. The two functions illustrated by FIGS. 1A and 1B are the critical functions of the network record system (50) invention. The invention has many other features, including remote access, print and search capabilities, calendar keeping and reminder functions, but making and saving original records permanently is the primary function of the invention. It prevents a user from overwriting a previously entered record. If a modification of a previously entered record is necessary, then both records will be maintained and displayed by the system. This assures the accuracy of the records against inadvertent mistakes or deliberate attempts to modify or change a previously entered record to conceal something within that record.

FIG. 2 shows a specific embodiment of an introductory web page for plane maintenance log network record system (50). The Federal Aviation Administration imposes stringent requirements and regulations on the general aircraft industry and private aircraft owners to keep maintenance log books for the air frame, aircraft engine or engines, the aircraft prop or props, and the avionics. In the embodiment of the network record system (50) shown here, the records are kept in accordance with the appropriate Federal Aviation Administration requirements. These stringent requirements demonstrate the many advantages this invention has over the current paper log book system for keeping these records. Typically, this kind of introductory web page will first have a heading (201), often incorporating graphics across the top, that names the web site that is being displayed. This is common practice in Internet commercial sites. For example, if one goes to "YAHOO.COM", the URL is "yahoo.com" is also displayed across the top of the web page that will be loaded and displayed on a client server (1). The web page will typically have a heading (201) combining both text and print showing the URL or other identifying information. Here, the URL displayed is "planelog.com", but it will readily be appreciated it could have other names for different types of records—that is, it could be "weighttraining.com", "carrecords.com", and so on. Typically, these pages will display not only information specific to this particular system, but in a commercial context may also have links to other web page sites, display advertisements for products or services or other web sites, and so on. In a commercial environment, much of the money generated by web sites are derived from advertisements for products or other web site services. For example, someone who is using a web site to maintain records regarding aircraft might also have an interest in current weather conditions, which is necessary in planning any kind of aircraft trip. Thus, there could be a link to weather related web sites. There could also be links to related commercial services, such as insurance, aircraft accessories, gifts having an aircraft orientation, books related to aircraft or the aircraft industry, and so on. In FIG. 2, no such links are shown but they are well known generally to users of the world wide web. Here the client system requirements (202) are displayed so that a user can be sure the client system (1) (seen in FIG. 1) and the connecting software (2) (seen in FIG. 1) meet these requirements before proceeding any further into the network record system (50).

Shown in FIG. 2 there are typically three immediate links directly connected to this network record system (50) invention. First, is a new user link (203). Consequently, someone who wishes to sign-up for the service must necessarily give information that will enable the service to be activated for their use (see FIGS. 2a1, 2a2, 2a3). This would include identifying information, billing information, and the like. Second, will be a tour link (205) which is essentially a free "look" at the network record system service (50). Many web sites that charge a subscription for full use of the site will give a free introductory tour or preview of the site to allow a perspective purchaser to determine if they are interested in the service being provided by the site. Finally, the introductory web page (21) allows one to log into the client database (22) using the log-in link (204) (see FIG. 2b).

FIG. 2a1 is the first page of three pages one is taken to by clicking onto the create new user link (203). As before, there is the URL header (201). Next, there is general information (210) about conditions for use of the network record system (50) by a new user. This could vary widely depending on the nature of the network record system (50). Obviously, the expense of maintaining the network record system (50) will have to be borne in some way. In the embodiment shown in FIGS. 2a1, 2a2, and 2a3, the expense is borne by the user for the convenience and features offered by the network record system (50). However, it is possible the network record system (50) could be offered as an accessory at no charge to the user as a service provided with a purchase. For example, an aircraft manufacturer could offer access to the network record system (50) for a period of time as an accessory for purchasing a particular type of airplane, thus enabling the buyer who purchases one type of plane to have free use of the network record system (50) to maintain the plane maintenance records. The plane manufacturer would offer this in hopes of obtaining a competitive advantage over competing planes. By the same token, a luxury car dealer could offer the network record system (50) to those who purchase a car from him to maintain car maintenance records. This would again offer a competitive advantage to competing dealers and would encourage users to use that dealer's maintenance services for his vehicle. In practice, it is found that there are many ways that web sites can support themselves. These include such things as banner advertising, "data mining", and so on. It is believed that the network record system invention (50) will find its widest use as a fee-based subscription service paid for by the user, but certainly variations are permitted within the scope of the invention.

FIG. 2a2 is the second of three pages required to create a new user and shows a registration form (230) commonly used for web sites. Here, there are general identity information fields (250) enclosed in boxes where one inputs specific information such as one's name, address, and so on. Here, in the specific embodiment shown for a plane log, it is necessary to put in information about pilot privileges, mechanic privileges, and so on. Again, there are specific information fields (260) for this aircraft related information Finally, billing information fields (270) that will enable the site to charge and bill for its use are included. Once one is registered, one is ready to proceed to the client database (22). As is the case in many commercial web based services, the user will signify agreement to the conditions of the site by entering a user name, a password, and verifying a password. In FIG. 2a3, this security information (211) is entered before one clicks on the next button (220) to go to the log in page, which is necessary for a fee-based subscription service.

The log in page is shown in FIG. 2b. Typically, an experienced user will go directly to page shown in FIG. 2b by using the log-in link (204) (shown in FIG. 2). One enters the client database (22) by entering his security information (211) in the appropriate boxes. One will then click on the plane log button (212) or the pilot log button (213). The remaining figures will be demonstrating network record system (50) for a plane log only. A pilot log operates similarly, but instead of recording records about maintenance on a plane, one records hours flown, type of flying, and so on. This is necessary to maintain one's pilot license according to Federal Aviation Administration standards. However, it will be readily appreciated by one of skill in the art, as the discussion proceeds for the network record system (50) for plane maintenance records, how that system could easily be modified to maintain individual flying records for a pilot to keep the pilot log (213). Once one has entered the security information (211), one clicks on the plane log link (212) to go to the next portion of the plane log embodiment of the network record system (50).

FIG. 3 shows the first page in a specific client database (22) in the network record system (50) that a specific user will enter in the plane log embodiment In FIG. 3, again the identifying header (201) is displayed. Below the header are links to different places on the system. First, is a link to pilot log (213), a modifier user detail link (214), a change password link (215), and a log-out link (216). These links are largely self-explanatory. A user who subscribes to both the plane log embodiment of the network record system (50) can link to the pilot log embodiment using pilot log link (213). The modifier user detail link (214) allows someone to change such things as credit card information, addresses, and so forth, as the information originally entered as shown in FIGS. 2a1, 2a2, and 2a3. Change password link (215) allows one to change security information (211). The log-out link (216) simply allows one to leave the network record system (50). The user name is part of the security information (211). Below the user name are categories for various parts of the network record system (50). First, is managed own aircraft (301), second, is managed maintained aircraft (302), third, is manage owned unattached engine (303), and fourth is manage owned appliances (304). This gives a user the opportunity of keeping records on the network record system (50) for owned aircraft, for maintained aircraft that are not owned by the user, for aircraft appliances, and for unattached engines. In this particular embodiment shown in FIG. 3, only the manage owned aircraft (301) category is active and will be considered in this description of the network record system (50). First, aircraft identifying information (305) appears. Secondly, there is an information box (350) which allows one to enter the current tachometer time for the aircraft. This will immediately update the aircraft's database based on this time. However, an entry is not required and one may click on the go link (360) to enter the next portion client database (22) of the network record system (50).

FIG. 4 displays the web page that is seen after clicking on the go link (360) shown in FIG. 3, on the first page of the specific client database (22). FIG. 4 displays most of the major functions of the client database (22). Again, there is the header information (201) as well as general information (305) that identifies the particular aircraft for which the plane log is being kept. It will be appreciated by one of skill in the art that there are many specific features of this particular embodiment of the network record system (50) which would be modified or changed for other embodiments. Instead of aircraft identifying information (305), which is necessary in a plane log maintenance record network record system (50), patient identifying information might appear in a medical record. Or the name of a person might appear if records are being kept for such things as exercise or diet. Here, there are links to other pages in the client database (22) for modified aircraft (370), weight and balance (380), and AD/SB (390). It is not necessary to discuss any of these in detail but, by way of example, if one clicks on the weight and balance link (380), one is taken to a separate page which functions to allow one to be sure the load and passengers are stowed correctly on an aircraft, which is a FAA requirement each time a flight is made. Obviously, no such weight and balance link (380) would be necessary for other types of records such as a medical record that could be kept through the network record system (50). Last entry and time information (315) is also displayed. These will be updated as necessary depending on when and how log entries are made. This simply gives immediate information to a user about when the last records were entered and the aircraft tachometer time as of the date of that record. Beside that is a alert box (308). The function of the network record system (50) can advise a user of specific maintenance requirements for his particular type of aircraft or aircraft engine. For example, if an aircraft is out of annual, then an alert would issue. The next four links are list entries (310), archive log (311), make entry (312), quick search (313), and event search (314) are critical to the overall functionality of this particular kind of record database and show some of the utility of allowing records to be kept over a network system as opposed to an individual computer. If one clicks on the list log entry link (310), results as are shown in FIG. 6 appear on the screen. If one clicks on make log entry (312), results as are shown in FIG. 5 appear on the screen. These will be discussed later when FIGS. 5 and 6 are described. The quick search (313) allows one to use search capabilities of the user system software to search for particular words. For example, in a record system for automobiles one might search for front wheel alignments. If one determines that front wheel alignments were having to be performed with regularity, this might alert one to a problem in the steering or front wheel equipment. The event search (314) allows one to search for particular kinds of events. This would depend on the type of records that were being kept in the network record system (50). There would be standardized event searches which would appear on a pull-down menu symbolized by the inverted triangle seen in the event search (314) box. For example, such things as oil changes, tire rotation, tune-ups, and the like might appear in a network record system maintenance log for an automobile. For a medical record, it might be such things as blood pressure, blood gases, temperature, and the other kinds of things that are performed on a regular basis and recorded as part of a record keeping system. This sort of search capability in a database is familiar to one of ordinary skill in the art.

FIG. 5 shows the web page that is displayed when one clicks on the make entry link (312) as in FIG. 4. Again, aircraft identifying information is displayed (305) along with the header (201). Ordinarily, the browsers will display this web page on a computer that uses a graphical user interface, which allows one to move the cursor that appears on the screen to particular boxes, activate those boxes, then type in entries so one might type in the name of a mechanic (401) and the mechanic's certificate number (402) in the various informational boxes that appear in FIG. 5. By the same token, identifying information for a repair station (403) or work order (404) would appear. The date would be appropriately entered using the date boxes (420). An entry would be typed into the log entry data box (405). For example, if a particular kind of repair was made or maintenance done, then that description would be given there. A tach entry (407) could be given for a tachometer time. For events occurring on a regular basis there are headers over boxes listing these regular maintenance event labeled major events, IFR events, and part 135 events, all of which are particular types of plane maintenance events. Highlighting an event in these boxes will index the record being entered in the search functions (313 and 314) seen in FIG. 4. For other types of record kept on the network record system (50), other types of stereotypical events might appear such as, for a medical record, a blood pressure, a temperature, and so on. When one has completed the entry and is ready to permanently enter it into the system, one clicks on the post log entry (406) at the very bottom of the page. This enters the record into the log and cannot thereafter be deleted by the user.

On the page shown in FIG. 4, if one clicks on the list entry (310), a link is made to a web page like FIG. 6. FIG. 6 displays log entries and is, in effect, like a page or pages in a paper log where, in consecutive order beginning with the most recent and scrolling backwards, a listing of various database entries are displayed. The columns show the entry whether original or modified, the date, the tachometer time, the total time, and the nature of what is being recorded in the entry. The mod column (501) shows the nature of the entry. It can be an original entry, an administrative entry, or a modified entry. The date column (502) simply shows the date that entries were made. The tach column (503) shows what the tachometer recorded at the time the entry was made. The total time column (504) records the total time of use of the aircraft. Ordinarily, this would be the same as the tach time but not necessarily so. The entry column (506) shows a portion of whatever has been entered on that date. For short matters, such as oil filters and change, they can be described completely on a log entry listing(506A), shown in FIG. 6. However, some maintenance entries will be significantly longer and for those one must use the details column (507). In each row there is a box labeled view (507A) or print (507B) These are self-explanatory. If one clicks on the view (507A), one will be transferred to a fuller and enlarged entry (see FIG. 7) or one may print the entry using the print (507B). A printed entry (not shown) will have appropriate provision for authentication by signature or other means for a user in the event such authentication may be required by regulations for that particular record system. Ordinarily, under the mod column (501) most listings will be labeled "Orig" meaning this is an original entry. However, if a modification has been made in the entry, then the term "mod" appears in the mod column (501). Therefore, any records that have been modified in the network record system (50) will be immediately and permanently labeled as such. If one clicks on the view button (507A), one will see the record as modified. Also, for an original unmodified entry, one also clicks on view (507A) beside an entry labeled "orig" in the mod column (501).

FIG. 7 is a display of the page that one sees if one clicks on view (507A) beside an log entry listing (506A) which has been labeled in the mod column (501) as "mod". The header (201) is displayed. Below that is identifying identification (305). Other identifying and administrative data (705) are given on this page including reasons for the modification. The log entry listing (506A) is displayed which gives full information about this particular maintenance log entry. Only a portion of this may be displayed in the entry column (506) on FIG. 6.

FIG. 7A displays an original unmodified record. This is the type of page one would see if one clicks on the view (507A) in FIG. 6 beside an entry which has been labeled in the mod column as "orig". This is closely similar to FIG. 7 except this is labeled as an original entry. Again there is administrative data (706) shown. If one wishes to modify this entry, one clicks on modify entry (709) button.

Figure 8:
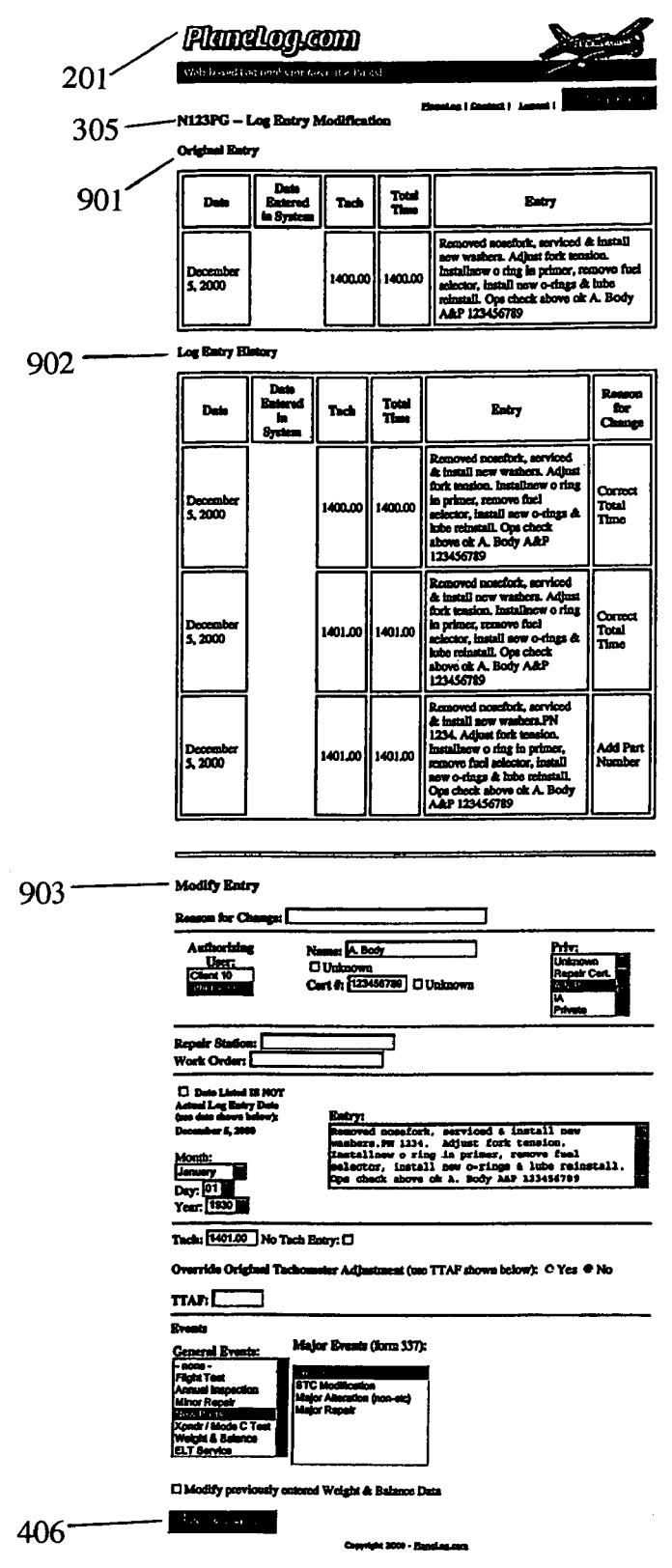

FIG. 8 displays in detail what one sees when one views the history of a modified entry or when one attempts to make a modified entry. A figure like FIG. 8 will be seen when one clicks on the "mod" label that appears in the mod column (501) as shown in FIG. 6. One will also see a page like FIG. 8 if one clicks on the modify entry (709) box in either FIG. 7 or 7A. The particular figure shown in FIG. 8 is what one sees when one clicks on an entry which has been previously modified. What would then be displayed on FIG. 8 is the original entry and a log entry history, which would show changes, if any, that had made in this entry before. If one wishes to modify the entry, one goes to the bottom of the page to the section headed "modify entry" (903).

In FIG. 8 there is the identifying information (305). Below that is the original entry much like that displayed on FIG. 6 but with the mod column deleted. Below that are a series of listings if required for showing previous modifications made in the original entry (901). The log entry history (902) shows all previous entries as well as the reasons for change. If one wishes to modify an entry, one uses the modify entry (903) part of FIG. 8. The modify entry (903) is very similar to what is seen in FIG. 5 except there is a data entry area for the reason for the change in the original entry. As with FIG. 5, one enters appropriate identifying information, including data to go in the entry. When one is finished, one posts the now modified log entry using the post log entry (406). Once the post log entry (406) is used, this is entered into the permanent database and cannot thereafter be changed by a user, but will appear in the log entry history (902) in appropriate order.

FIGS. 7, 7A, and 8 show how a network record keeping system invention adds a special utility to ordinary computer databases that keep records. Here, because a separate database is kept in a network server (20), which is physically separated from the client system (1), it makes it possible to maintain a record which cannot be deleted by the client system (1). As shown in FIGS. 7 and 8, any record that has been previously modified is clearly labeled as such and a history showing the original entry and the reasons for modification will be available to any user of the system. In effect, the network server (20) in the network record system (50) serves as a guarantor of the authenticity and accuracy of the records that have been logged into system. Once a record is logged into the system, it cannot be deleted and will be available for view by any authorized user of the system. This has important implications in many record systems, which can increase the value of used equipment, guarantee the authenticity of medical records, and establish dates, records, and times that are not dependent on the credibility of the user of the system. It will be appreciated by one of skill in the art that the particular embodiment described in the foregoing figures is for illustration only and that this description is not a limitation on the scope of the invention, which is limited only by the claims which follow.

I claim:

1. A method for keeping a permanent, undeleteable record using a network comprising:
    (a) establishing a client system;
    (b) establishing a server system;
    (c) establishing a back-up system;
    (d) connecting said client system, said server system, and said back-up system;
    (e) under the control of said client system, displaying a record form, and in response to data entered on said client system, completing data fields in said record form and sending said completed record form to said server system with a unique client identifier;
    (f) under the control of said server system, receiving said record with said data and said unique client identifier, and storing said record in a segregated database keyed to said client identifier whereby once said record is stored using said identifier said record cannot hereafter be deleted;
    (g) under the control of said back-up system, receiving said completed record form permanently stored in said server system, and making a permanent back-up so that a back-up of said segregated database is made,
whereby said client system, said server system, said back-up system, and said means for connection are used to make and store an undeleteable permanent record in said server system that is accessible to said client system and backed up in said back-up system.

2. A method for keeping a permanent, undeleteable record using a network of claim 1 wherein under the control of said server system providing automatic warnings of non-compliance with regulations and sending said warnings to said client system whereby aid is provided in avoiding inadvertent regulatory violations.

3. A method for keeping a permanent, undeleteable record using a network of claim 2 wherein under the control of said server system, providing notification of maintenance requirements to said client system whereby planning for necessary maintenance is facilitated.

4. A method for keeping a permanent, undeleteable record using a network of claim 3 wherein under the control of said client system, using said unique client identifier is required to gain access to records stored under the control of said server system in said segregated database keyed to said client identifier.

5. A method for keeping a permanent, undeleteable record using a network of claim 4 wherein under the control of said server system, providing search capabilities to said client system for searching of said segregated database.

6. A method for keeping a permanent, undeleteable record using a network of claim 5 wherein under the control of said server system, providing a tracking history of all record forms stored in said segregated database.

7. A method for keeping a permanent, undeleteable record using a network of claim 6 wherein under the control of said client system providing a means for printing copies of record forms stored in said segregated database keyed to said client identifier.

8. A computerized record keeping system comprising:
    (a) a client computer having a display, a keyboard for data entry, a network connection, and software enabling said client computer to connect to said network connection;
    (b) a server computer with a network connection and record keeping software;
    (c) back-up data storage computer having a network connection;
    (d) means for making a record on said client computer and sending said record on said network connection to said server computer, said record keyed to a unique client identifier;
    (e) means for receiving a client system generated record in said server and storing and organizing said client system generated record with record keeping software in said server computer whereby once a client system generated record is recorded and stored in said server system, it is thereafter undeleteable by said client system;
    (f) means for making a back-up copy of said client generated record in said back-up data storage computer.

9. A computerized record keeping system of claim 8 wherein said server computer has means for sending automatic warnings of non-compliance with regulations to said client computer whereby a user of said computerized record system receives notice of non-compliance with regulations on said client computer to avoid inadvertent regulatory violations.

10. A computerized record keeping system of claim 9 wherein said server computer and record keeping software has means to provide notice to said client computer of maintenance requirements whereby a user of said computerized record keeping system may make plans for necessary maintenance.

11. A computerized record keeping system of claim 10 wherein said unique client identifier may be used to gain access to records stored in said server computer from any computer having a network connection.

12. A computerized record keeping system of claim 11 wherein said server computer has means for providing search capabilities in said record keeping software for said client system generated records.

13. A computerized record keeping system of claim 12 wherein said client computer has means for printing copies of said records stored in said server computer.

14. A computerized record keeping system to insure compliance with Federal Aviation Administration regulations and to assure accuracy of records kept comprising:
    (a) a client computer having a display, means for data entry, means for connection to a network, and software using said means for network connection to connect a remote server computer;
    (b) said remote server computer with means for network connection to said client computer and said client computer software, and with record keeping software for Federal Aviation Administration records to record compliance with regulations;
    (c) said record keeping software with means for providing automatic warnings of non-compliance with Federal Aviation Administration regulations to said client computer;
    (d) said record keeping software in said remote server computer with means for storing records to record compliance with Federal Aviation Administration regulations so that a record once stored is thereby undeleteable by using said client computer;

(e) said record keeping software accessible to a client computer only through use of a unique client identifier whereby said client computer, said remote server computer, and said record keeping software can be used to make and store undeleteable permanent record in said server computer of records that assure compliance with Federal Aviation Administration records.

15. A computerized record keeping system to assure compliance with Federal Aviation Administration regulations and to assure accuracy of records kept of claim 14 wherein said record keeping software keeps plane maintenance records to assure compliance with Federal Aviation Administration regulations regarding plane maintenance.

16. A computerized record keeping system to assure compliance with Federal Aviation Administration regulations and to assure accuracy of records kept of claim 15 wherein said record keeping software further includes keeping pilot flying records to assure compliance with Federal Aviation Administration regulations regarding pilot qualifications.

17. A computerized record keeping system to assure compliance with Federal Aviation Administration regulations and to assure accuracy of records kept of claim 16 wherein said remote server computer, said client computer, and said record keeping software have means in said remote server computer to provide notification to said client computer of the pendency of maintenance requirements for plane maintenance records.

18. A computerized record keeping system to assure compliance with Federal Aviation Administration regulations and to assure accuracy of records kept of claim 17 wherein said record keeping software has means for providing search capabilities to said client computer for searching records kept in said record keeping software in said remote server.

19. A computerized record keeping system to assure compliance with Federal Aviation Administration regulations and to assure accuracy of records kept of claim 18 further including a back-up server whereby duplicate copies are kept of records recorded in said record keeping software to assure against destruction or loss of said records.

20. A computerized record keeping system to assure compliance with Federal Aviation Administration regulations and to assure accuracy of records kept of claim 19 wherein said client computer further includes a printer for printing copies of records kept in said record keeping software in said remote server computer.

\* \* \* \* \*